(12) United States Patent
Yukawa et al.

(10) Patent No.: US 8,380,385 B2
(45) Date of Patent: Feb. 19, 2013

(54) SYSTEM AND METHOD FOR DETERMINING ELECTRONIC LOGBOOK OBSERVED DEFECT FIX EFFECTIVENESS

(75) Inventors: Steven J. Yukawa, Seattle, WA (US); Rajit Jain, Seattle, WA (US); Timothy W. Anstey, Seattle, WA (US)

(73) Assignee: The Boeing Company, Chicago, IL (US)

( * ) Notice: Subject to any disclaimer, the term of this patent is extended or adjusted under 35 U.S.C. 154(b) by 683 days.

(21) Appl. No.: 12/269,315

(22) Filed: Nov. 12, 2008

(65) Prior Publication Data
US 2010/0121520 A1 May 13, 2010

(51) Int. Cl.
G01M 17/00 (2006.01)
(52) U.S. Cl. ........... 701/29; 701/24; 701/25; 701/30
(58) Field of Classification Search .......... 701/3, 4, 701/13, 14, 15, 16, 24, 25, 29
See application file for complete search history.

(56) References Cited

U.S. PATENT DOCUMENTS

| | | | |
|---|---|---|---|
| 6,795,935 B1 | 9/2004 | Unkle et al. | |
| 6,917,863 B2 * | 7/2005 | Matos | 701/16 |
| 6,965,816 B2 * | 11/2005 | Walker | 701/16 |
| 6,981,182 B2 * | 12/2005 | Roddy et al. | 714/47.3 |
| 7,260,505 B2 * | 8/2007 | Felke et al. | 702/187 |
| 7,376,497 B2 * | 5/2008 | Chen | 701/29 |
| 7,487,016 B2 * | 2/2009 | Fowell et al. | 701/13 |
| 7,551,063 B2 * | 6/2009 | Inbarajan | 340/425.5 |
| 7,551,086 B2 * | 6/2009 | Coop et al. | 340/572.1 |
| 7,801,702 B2 * | 9/2010 | Berbaum et al. | 702/185 |
| 7,881,837 B2 * | 2/2011 | Misawa et al. | 701/33 |
| 7,920,944 B2 * | 4/2011 | Gould et al. | 701/33 |
| 2002/0138235 A1 | 9/2002 | Edwards et al. | |
| 2006/0174167 A1 | 8/2006 | Ito | |
| 2007/0219676 A1 | 9/2007 | Allen et al. | |
| 2008/0005617 A1 | 1/2008 | Maggiore et al. | |
| 2008/0157583 A1 | 7/2008 | Boren et al. | |

FOREIGN PATENT DOCUMENTS

| | | |
|---|---|---|
| EP | 1748394 | 1/2007 |
| WO | WO2007/136522 | 11/2007 |

OTHER PUBLICATIONS

International Search Report and Written Opinion for corresponding International Application No. PCT/US2009/063404 dated Aug. 5, 2010, 10 pages.

* cited by examiner

*Primary Examiner* — Toan To
(74) *Attorney, Agent, or Firm* — Harness, Dickey & Pierce, P.L.C.

(57) ABSTRACT

A method for automating tracking of an effectiveness of fault repairs. The method may involve defining a unique fault code for each one of a plurality of different faults; cataloging faults that are repaired according to their respective fault codes and storing each cataloged fault in a fix effectiveness subsystem; placing the fix effectiveness subsystem in communication with an electronic logbook (ELB) system that is able to populate the fix effectiveness subsystem with additional fault information; providing a user interface to enable a user to access said ELB system to obtain information on a specific fault condition that was previously stored on the fix effectiveness subsystem; and presenting a fault history to the user from information stored in the fix effectiveness subsystem that enables the user to select a repair procedure for correcting the specific fault condition.

19 Claims, 3 Drawing Sheets

SYSTEM AND METHOD FOR DETERMINING ELECTRONIC LOGBOOK OBSERVED DEFECT FIX EFFECTIVENESS

FIELD

The present disclosure relates to systems and methods for logging defect reports, and more particularly to a system and method for electronically logging defect reports so that the effectiveness of repair actions can be tracked over time and displayed when addressing a subsequent occurrence of a defect.

BACKGROUND

The statements in this section merely provide background information related to the present disclosure and may not constitute prior art.

In commercial aircraft maintenance operations, current fault isolation and troubleshooting procedures provide some guidance to an airline by recommending procedures for a maintenance person to follow, based on a variety of observations. These procedures are developed during initial design and certification of an aircraft and often provide a variety of ways to address a fault condition.

Of the variety of ways, it is left to the experience of the airline mechanic to decide what course of repair action to follow. This can lead to repeated "shotgun maintenance" where parts are removed/replaced with the hope that a fault condition is repaired. Knowledge of previous fault observations and the outcome of the repair attempts made to address the fault condition will help improve choosing the maintenance task/action when a defect occurs again.

Current tracking of fix effectiveness is performed on aircraft monitored faults. This occurs when fault conditions that an aircraft subsystem detects are reported automatically to a central maintenance computing function. The reports are then collected by an aircraft fault monitoring and fix effectiveness tracking tool. However, the current "automatic" fault recording does not extend to human observed and reported defects, which can be termed "non-monitored defects". For non-monitored faults, airlines rely on fixed fault isolation procedures supplemented by informal experience based knowledge of line mechanics and maintenance control personnel. Knowledge of historical fix effectiveness and use of this information to select a proper course of action is significantly influenced by individual experience.

The existing use of informal knowledge based on past experience allows for only very limited "learning" of what is the best course of corrective action to take for a specific, given fault observation. Thus, the probability of the maintenance technician selecting a repair action that corrects the fault condition immediately on the first repair attempt is expected to be lower with the current experience-based methods, when compared to an automated and data driven repair effectiveness tracking method. Furthermore, while the mechanic and/or maintenance experience may be effective in some instances in quickly identifying the proper repair action, it still does not allow a maintenance organization to learn effectively from the experience of its individual members. Nor does it facilitate using the accumulated knowledge of individual maintenance persons by an airline or the larger aviation community.

SUMMARY

In one aspect the present disclosure relates to a method for automating tracking of an effectiveness of fault repairs. The method may comprise defining a unique fault code for each one of a plurality of different faults. Faults that are repaired are catalogued according to their respective fault codes and each cataloged fault is stored in a fix effectiveness subsystem. The fix effectiveness subsystem is placed in communication with an electronic logbook (ELB) system that is able to populate the fix effectiveness subsystem with additional fault information. A user interface is provided to enable a user to access the ELB system to obtain information on a specific fault condition that was previously stored on the fix effectiveness subsystem. A fault history is then presented to the user from information stored in the fix effectiveness subsystem that enables the user to select a repair procedure that has an increased likelihood of correcting the specific fault condition.

In another aspect the present disclosure relates to a method for automating tracking of an effectiveness of fault repairs. The method may comprise defining a unique fault code for each one of a plurality of different fault conditions. Faults that are repaired are then catalogued according to their respective fault codes and each cataloged fault is stored in a fix effectiveness database. The fix effectiveness database is placed in communication with an electronic logbook (ELB) system that is able to populate the fix effectiveness database with additional fault information from at least one external source. A user is provided with an interface to enable the user to access the ELB system to obtain information on a specific fault condition that was previously stored on the fix effectiveness database. A fault history is presented to the user from information stored in the fix effectiveness database that enables the user to select a repair procedure that has an increased likelihood of correcting the specific fault condition. The user interface enables the user to input information concerning a repair procedure performed and parts removed and replaced by the user to remove the specific fault condition, into a fix effectiveness tool in communication with the fixed effectiveness database. The inputted information is stored as a codified defect report for future access in the fix effectiveness database.

In still another aspect the present disclosure relates to a system for automating tracking of an effectiveness of fault repairs. The system may comprise an electronic logbook (ELB) system for generating fault repair information. A fix effectiveness subsystem is in communication with the ELB system and used for cataloging faults that are repaired according to specific fault codes, and storing each cataloged fault as a codified defect report. The ELB system is able to populate the fix effectiveness subsystem. A user interface enables a user to access the ELB system to obtain information on a specific fault condition that was previously stored on the fix effectiveness subsystem. The user interface includes a visual display that presents a fault history report comprised of a plurality of previously stored codified defect reports to the user from information stored in the fix effectiveness subsystem. The fault history report enables the user to select a repair procedure that has an increased likelihood of ameliorating the specific fault condition.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
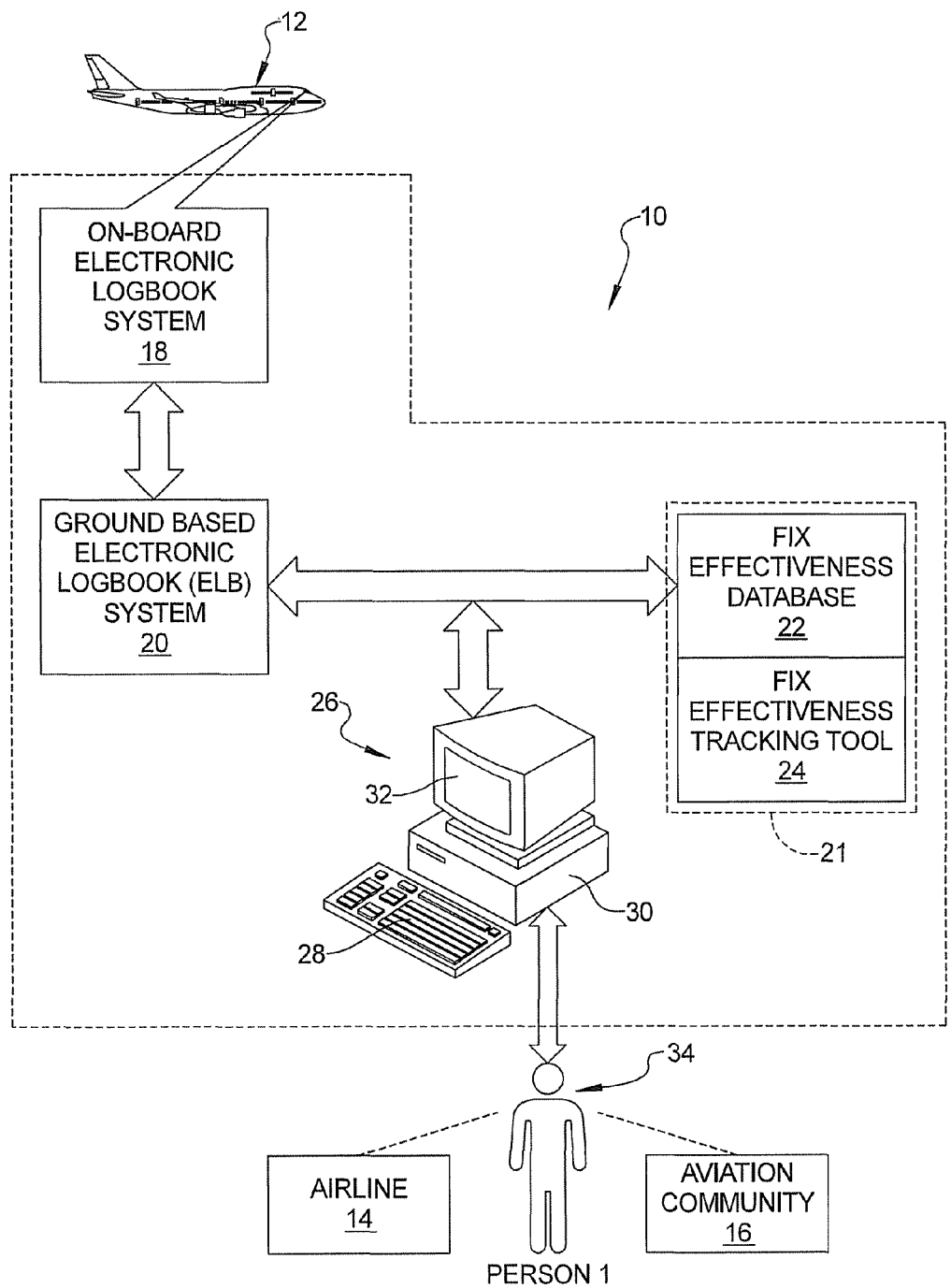
FIG. 1 is a block diagram of a system in accordance with one embodiment of the present disclosure.

The following description is merely exemplary in nature and is not intended to limit the present disclosure, application, or uses. It should be understood that throughout the drawings, corresponding reference numerals indicate like or corresponding parts and features.

Referring to FIG. 1, a system 10 for tracking the effectiveness of maintenance and/or repair operations is shown in accordance with one embodiment of the present disclosure. The system 10 may be used with a mobile platform, for example an aircraft 12, an airline 14 operating the aircraft, and other aviation entities within an aviation community 16 (e.g., other airlines or maintenance organizations). However, it will be appreciated that the system 10 is not limited to use with only mobile platforms. The system 10 is expected to find utility in any application where it is desirable to track the effectiveness of repair and/or maintenance operations. Such other applications might involve, for example, the maintenance of complex machinery or computer systems within a factory environment. Alternatively, the system 10 could just as readily be implemented in connection with the repair and/ or maintenance of marine vessels, spacecraft, land vehicles, under water vessels, etc.

In this example the system 10 is used with the aircraft 12, with the aircraft 12 having an on-board electronic logbook ("ELB") system 18. The system 10 itself may include a ground based ELB administration system 20 (hereinafter simply the "ground based ELB system 20") that is in bidirectional communication with a fix effectiveness subsystem 21 having a fixed effectiveness database 22 and a fix effectiveness tracking tool 24. The fix effectiveness database 22 and tracking tool 24 are both in bidirectional communication with a user interface formed by a computer terminal 26, via the ground based ELB system 20. The user computer terminal 26 in this example has a keyboard 28, a processor 30 and a display terminal 32. A user 34, who may be associated with the airline 14 or another entity connected with the aviation community 16, may input fault, repair or maintenance information to the ground based ELB system 20 via the keyboard 28. The user 34 may view fault history, repair history and fix effectiveness information stored in the fix effectiveness database 22 via the display terminal 32. Alternatively, the fix effectiveness database 22 and the fix effectiveness tracking tool 24 could form a portion of a separate aircraft health maintenance software application that the system 10 is interfaced to.

In general, the on-board ELB system 18 communicates with the ground based ELB system 20 of the system 10. The ground based ELB system 20 may also receive repair or fault history information updates from either the airline 14 or the aviation community 16. The ground based ELB system 20 may provide fault history updates to the fix effectiveness database 22. The ground based ELB may also obtain fault history information stored in the fix effectiveness database and may forward same to the airline 14 and the aviation community 16. Thus, the fix effectiveness database 22 may be populated by information input by the user 34 as well as information originating from the on-board ELB system 18, the ground based ELB system 20, the airline 14, the aviation community 16 or any other entity having valuable repair/ maintenance information that would be advantageous to maintenance persons and/or mechanics. The fix effectiveness tracking tool 24 may be formed by a system or database that tracks information concerning specific repair actions taken and any follow up repair actions for the same problems, or the absence of follow up actions for a specific repair action taken.

Fault or maintenance information is stored in the fix effectiveness database 22 through the creation of codified defect reports and codified maintenance actions and part replacements. A specific codified defect report, for example, may include information concerning a specific fault that was encountered by a maintenance person, a specific fault object (e.g., a particular sensor, valve, etc.) existing on the aircraft 12, a specific condition of the object found (or believed) to be at fault, and a specific location of the object. The codified defect report may also include a date on which the repair action was performed, as well as the name of the maintenance individual that created the report. The fault may be assigned a specific fault code (e.g., a number or alphanumeric) that represents the fault and enables the codified defect report to be cataloged in, and retrieved quickly from, the fix effectiveness database 22. Similarly, a codified maintenance action may include information on a part that has been replaced as well as any specific tasks performed as part of a maintenance action (e.g., recalibration or alignment of a subsystem after installing the new part).

Within the fix effectiveness database 22 various codified defect reports or codified maintenance actions may be grouped to form a fault history report or a maintenance history report. Either report may be displayed on the display terminal 32. The fault history report may present all of the codified defect reports relating to a specific part that has been replaced, or a specific fault condition. The maintenance history report may similarly include a listing of all of the codified maintenance reports concerning the maintenance of a specific component or subsystem, for example what parts were replaced and on what date, any adjustments, alignments. calibrations, cleanings, or other maintenance operations that were performed in connection with the replaced part or maintenance operation. Thus, it will be appreciated that a maintenance operation may or may not involve the replacement of a particular component part; nevertheless, the codified maintenance report created will include the pertinent information concerning the just-performed maintenance action.

The user 34 may retrieve a fault and/or repair history from the fix effectiveness database 22 by using any suitable input device, for example a keyboard 28. The use of keyboard 28 enables the inputting of words via the keyboard 28 that either describe the fault condition or the suspected faulty part, or by a part number of a suspected (or known) faulty part, or by a predetermined fault code associated with the specific fault condition. It may also be possible use a mouse and a menu tree to enable the user to input specific part numbers, fault codes, etc. The ground based ELB system 20 uses the inputted information to construct the fault history report using previously stored fault information in the fix effectiveness database 22.

The ground based ELB system 20 (or the alternative aircraft health management application 25) may also monitor new codified defect reports entered into the fix effectiveness database 22 and updates each newly entered report with a "successful" designation if no subsequent codified defect report is entered for the exact same component within a predetermined time interval, for example 15 days. Thus, a maintenance person who has pulled up codified defect reports (pertaining to a specific object and specific fault condition)

will see previously performed repair actions and/or part replacements by other maintenance persons and information on the rate of accomplishing a successful repair via those specific repair actions and/or parts replaced. This display of information may provide a ranked order indicating first the most successful repair options followed by less successful options.

The use of codified defect reports also makes it easy to generate reports concerning the repair effectiveness of specific repair procedures relative to specific components. The system 10 (with or without the use of the aircraft health maintenance application 25) accomplishes this by determining the percentage of successful repairs when a specific repair action is performed on a specific component a number of times over a given time period. For example, the system 10 can generate an error report showing that replacement of a specific valve in response to a specific type of fault condition will result in a 99% repair success rate.

Figure 2:
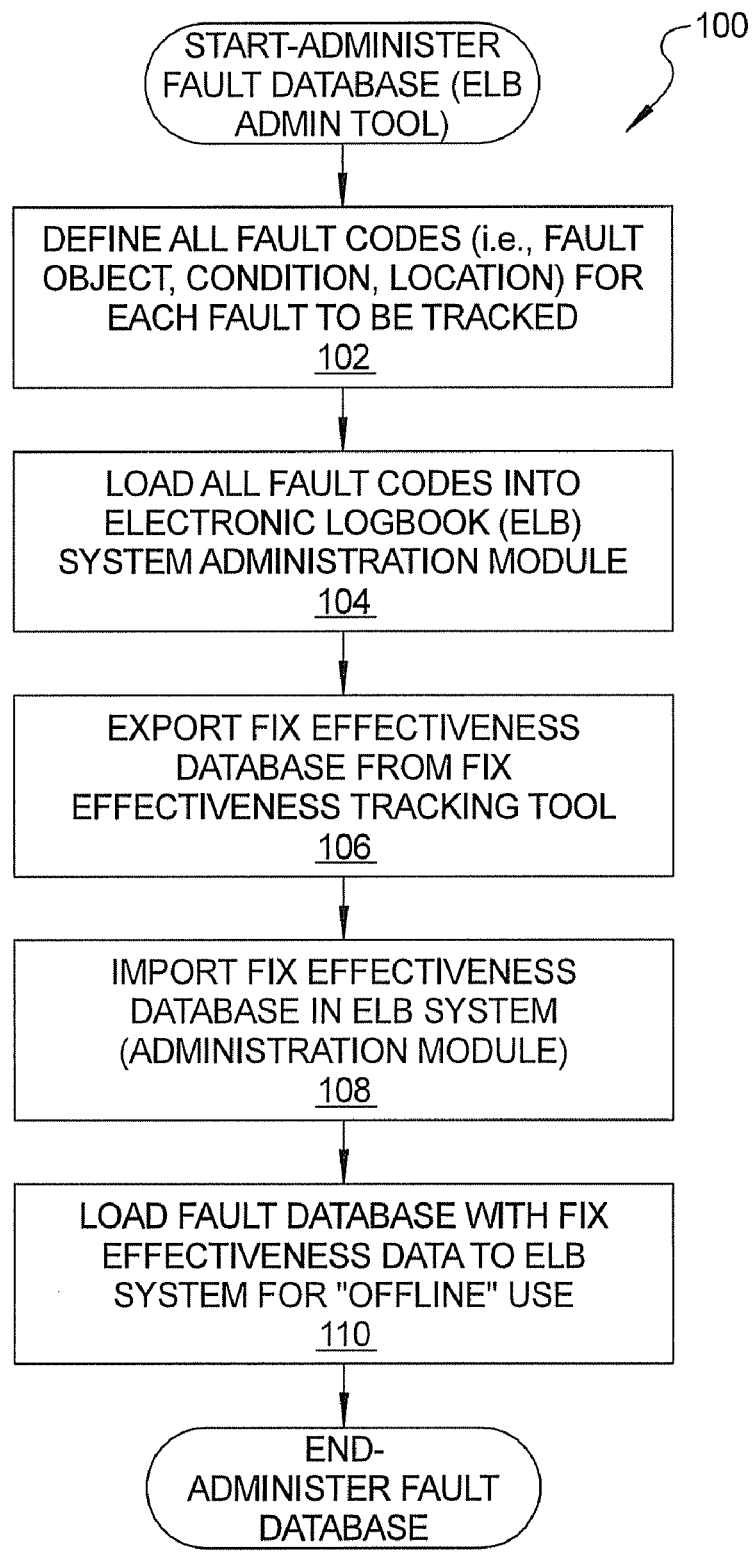
FIG. 2 is a flowchart illustrating operational steps in preparing the system 10 for use.

Turning now to FIG. 2, a flowchart 100 is shown that sets forth exemplary operations in forming and preparing the system 10 for use. At operation 102, all fault codes are defined, including the name of the component, the defective conditions for the component and the possible locations of the component, for each fault to be tracked by the fix effectiveness database 22. At operation 104 all fault codes are loaded into the ground based ELB system 20. At operation 106 the fix effectiveness database 22 is exported (i.e., populated with fault codes and available repair options and their fix effectiveness rating). At operation 108 the fix effectiveness database 22 is imported into the ground based ELB system 20. At operation 110 the combined fault code and fix effectiveness database is built from the ELB system 20 and deployed to the ELB system for offline use.

Figure 3:
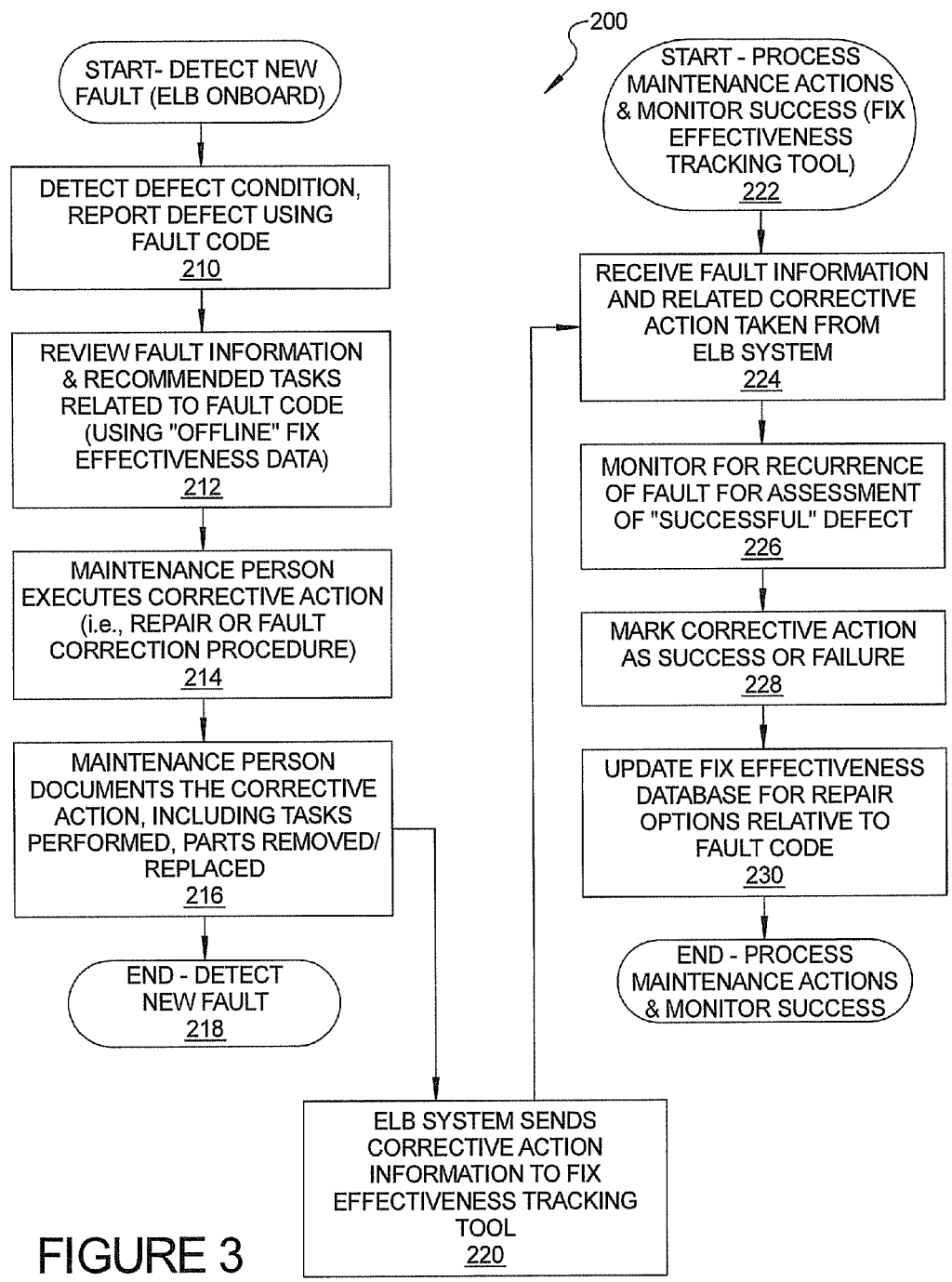
FIG. 3 is a flowchart illustrating operations performed by the system in monitoring the effectiveness of a repair operation taken by a user.

Referring to the flowchart 200 of FIG. 3, a sequence of operations will be described in using the system 10. At operation 210 a maintenance person analyzes a fault, for example a suspected faulty component or subsystem, and initially uses the computer system 26 to pull up any available fault history information data stored in the fix effectiveness database 22, as indicated at operation 212, that is available for offline use by the maintenance person. This may involve the ground based ELB system 20 checking the fix effectiveness database 22 to see if any pertinent fault history information is available. If such fault history information is available, then the information is displayed on the display terminal 32 for the user to view, as indicated at operation 114. The maintenance person considers the available fault history information before deciding on a specific course of repair (e.g., replacing a specific component). The maintenance person then proceeds with performing a specific repair or corrective action, as indicated at operation 214. The maintenance person then documents the corrective action at operation 216. This may involve documenting specific tasks performed and/or specific parts removed and replaced through a maintenance action completion record generated by the maintenance person. The maintenance action completion record may include specific tasks performed (by task number) and part numbers changed. These task numbers performed and part numbers changed (which may be viewed as "codes") may be used as the basis for tracking fix effectiveness. In addition to this, maintenance action documentation may typically include an overall maintenance action code, but this would not necessarily help fix effectiveness tracking as it would indicate "part changed" or "adjusted", but may not specify in sufficient detail what specific action was performed. At this point the work of the maintenance person is finished, as indicated at operation 218. However, operation of the system 10 continues with the ELB ground based system 20 sending corrective action information to the fix effectiveness tracking tool 24 (FIG. 1) as indicated at operation 220.

The task of starting the processing of maintenance actions and monitoring of success of the repair/maintenance action (using the fix effectiveness tool 24) is indicated at operation 222. This process begins by the fix effectiveness tool 24 receiving fault information and related corrective action information taken from the ELB ground based system 20, as indicated at operation 224. The fix effectiveness tracking tool 24 monitors for the recurrence of a fault so that it can make an assessment of whether a successful repair action was been taken, as indicated at operation 226. At a point in time after the repair action was taken, the fix effectiveness tool 24 marks the correction action taken as a success or a failure, as indicated at operation 228. The fix effectiveness database 22 is then updated with this information, as indicated at operation 230.

The codified defect reports stored in the fix effectiveness database 22 can be used by the ground based ELB 20 to generate repair effectiveness reports for repairs performed on each given aircraft in the airline's 14 fleet, or for repairs performed within a given date range. Most importantly, the system 10 allows accumulated knowledge of specific individual maintenance persons and mechanics to be easily shared by other maintenance persons and individuals. The system 10 thus allows a knowledge "store" or repository to be created that is available to all individuals using the system 10. Thus, the knowledge base of each individual maintenance person using the system 10 is significantly enhanced. In effect, each maintenance person has the benefit of access to information concerning repair operations previously performed by other maintenance persons, and can use this repair/maintenance history information to make a more fully informed decision on which type of repair action to perform first when attempting to remedy a fault condition.

The system 10 also provides the advantage of improving the repair recommendations made available to the maintenance/repair person as the system 10 collects, analyzes and codifies greater and greater amounts of historical repair and fault information. In effect, the system 10 "knowledge" or "learning" increases over time as more and more repair/fault information is collected, and thus the system 10 is able to provide more and more accurate and useful repair/fault recommendations to each user as time goes on. Also, as more and more users access the system 10 and provide fault/repair/maintenance that is analyzed and codified by the system, the system 10 recommendations will be become even more helpful and even more accurate.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:
1. A method for automating tracking of an effectiveness of fault repairs, comprising:
    defining a unique fault code for each one of a plurality of different faults;
    cataloging faults that are repaired according to their respective said fault codes and storing each said cataloged fault in a fix effectiveness subsystem;

placing said fix effectiveness subsystem in communication with an electronic logbook (ELB) system that is able to populate said fix effectiveness subsystem with additional fault information;

providing a user interface to enable a user to access said ELB system to obtain information on a specific fault condition that was previously stored on said fix effectiveness subsystem; and presenting a fault history to said user from information stored in said fix effectiveness subsystem that enables said user to select a repair procedure for correcting said specific fault condition; and enabling said user to input a new codified defect report concerning a specific repair operation that said user has performed into said fix effectiveness subsystem via said user interface.

2. The method of claim 1, wherein said placing said fix effectiveness subsystem in communication with an ELB system comprises:

placing a fix effectiveness tracking tool in communication with a fix effectiveness database, and placing both said fix effectiveness tracking tool and said fix effectiveness database in communication with said ELB system;

using said fix effectiveness tracking tool to receive and monitor information concerning specific repair actions taken; and using said fix effectiveness database to store fault information provided by said fix effectiveness tracking tool.

3. The method of claim 1, wherein said presenting a fault history comprises presenting a fault history pertaining to a component of a mobile platform.

4. The method of claim 1, wherein said presenting a fault history comprises presenting a fault history pertaining to a component of an airborne mobile platform.

5. The method of claim 1, wherein said cataloging faults comprises generating a codified defect report that is stored in a fix effectiveness database of said fix effectiveness subsystem.

6. The method of claim 5, wherein said generating a codified defect report comprises generating a codified defect report that includes information concerning at least a plurality of a fault object, an object condition, and a fault location.

7. The method of claim 1, wherein said cataloging faults comprises generating a codified maintenance action that is stored in a fix effectiveness database of said fix effectiveness subsystem.

8. The method of claim 1, further comprising using said ELB to monitor said new codified defect report for a predetermined period of time, and when no subsequent codified defect report is entered for a predetermined period of time, that pertains to said new codified defect report, then updating said fix effectiveness subsystem to reflect that said specific repair operation is deemed to be successful.

9. The method of claim 4, further comprising enabling an airline to populate said fix effectiveness subsystem with additional codified defect reports.

10. The method of claim 9, further comprising enabling aviation entities other than said airline to also populate said fix effectiveness subsystem with further codified defect reports.

11. A method for automating tracking of an effectiveness of fault repairs, comprising:

defining a unique fault code for each one of a plurality of different fault conditions;

cataloging faults that are repaired according to their respective said fault codes and storing each said cataloged fault in a fix effectiveness database;

placing said fix effectiveness database in communication with an electronic logbook (ELB) system that is able to populate said fix effectiveness database with additional fault information from at least one external source;

providing a user interface to enable a user to access said ELB system to obtain information on a specific fault condition that was previously stored on said fix effectiveness database;

presenting a fault history to said user from information stored in said fix effectiveness database that enables said user to select a repair procedure for correcting said specific fault condition;

using said user interface to enable said user to input information concerning a repair procedure performed and parts removed and replaced by said user to remove said specific fault condition, into a fix effectiveness tracking tool in communication with said fix effectiveness database, and storing said inputted information in said fix effectiveness database as a codified defect report for future access; and presenting said fault history on a visual display system.

12. The method of claim 11, wherein said presenting a fault history comprises presenting a fault history pertaining to a component of a mobile platform.

13. The method of claim 11, wherein said presenting a fault history comprises presenting a fault history pertaining to a component of an airborne mobile platform.

14. The method of claim 11, further comprising enabling at least one of an airline and an aviation entity other than said airline to also populate said fix effectiveness database with further codified defect reports.

15. The method of claim 11, further comprising using said ELB system to monitor said codified defect report for a predetermined period of time, and when no subsequent codified defect report is entered for a predetermined period of time that pertains to said new codified defect report, then updating said fix effectiveness tracking tool to reflect that said repair procedure performed by said user is deemed to be successful.

16. The method of claim 15, wherein said presenting a fault history comprises generating a listing of all codified defect reports pertaining to repairs performed to remedy a specific type of fault condition.

17. A system for automating tracking of an effectiveness of fault repairs, comprising:

an electronic logbook (ELB) system for generating fault repair information;

a fix effectiveness subsystem in communication with said ELB system for cataloging faults that are repaired according to specific fault codes, and storing each said cataloged fault as a codified defect report, said ELB system being able to populate said fix effectiveness subsystem;

a user interface that enables a user to access said ELB system to obtain information on a specific fault condition that was previously stored on said fix effectiveness subsystem; and said user interface including a visual display that presents a fault history report comprised of a plurality of previously stored codified defect reports to said user from information stored in said fix effectiveness subsystem that enables said user to select a repair procedure for ameliorating said specific fault condition.

18. A method for automating tracking of an effectiveness of fault repairs, comprising:

defining a unique fault code for each one of a plurality of different faults;

cataloging faults that are repaired according to their respective said fault codes and storing each said cataloged fault in a fix effectiveness subsystem;

placing said fix effectiveness subsystem in communication with an electronic logbook (ELB) system that is able to populate said fix effectiveness subsystem with additional fault information;

providing a user interface to enable a user to access said ELB system to obtain information on a specific fault condition that was previously stored on said fix effectiveness subsystem;

presenting a fault history to said user from information stored in said fix effectiveness subsystem that enables said user to select a repair procedure for correcting said specific fault condition, said fault history pertaining to a component of an airborne mobile platform; and enabling an airline to populate said fix effectiveness subsystem with additional codified defect reports.

19. A method for automating tracking of an effectiveness of fault repairs, comprising:

defining a unique fault code for each one of a plurality of different faults;

cataloging faults that are repaired according to their respective said fault codes and storing each said cataloged fault in a database of a fix effectiveness subsystem;

placing said fix effectiveness subsystem in communication with an electronic logbook (ELB) system that is able to populate said fix effectiveness subsystem with additional fault information;

providing a user interface to enable a user to access said ELB system to obtain information on a specific fault condition that was previously stored on said database of said fix effectiveness subsystem; and using a fix effectiveness tracking tool of said fix effectiveness subsystem to monitor for recurrences of faults, and to update the database with information indicating whether previously made repairs were successful or unsuccessful.

* * * * *